Dec. 20, 1927.  1,653,438
E. McLEAN
REGULATOR OR CONTROLLER
Original Filed June 25, 1920
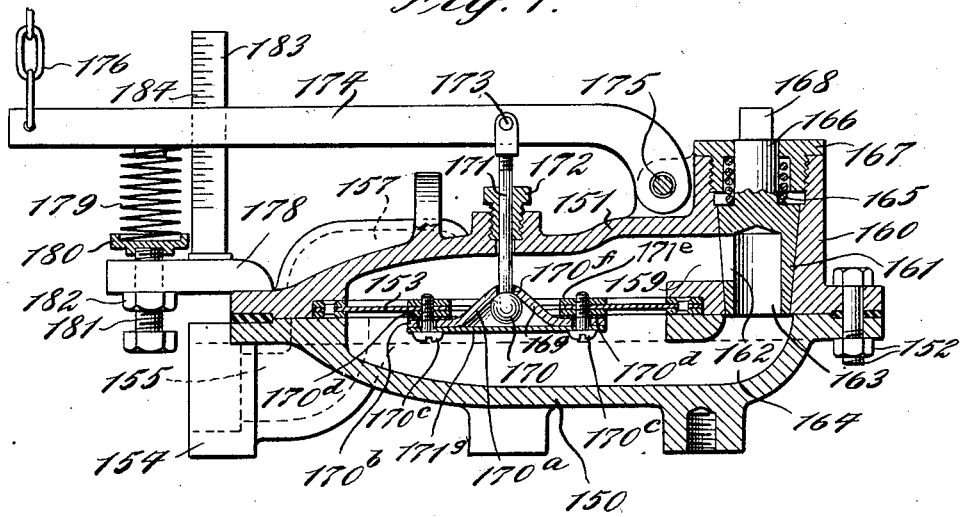
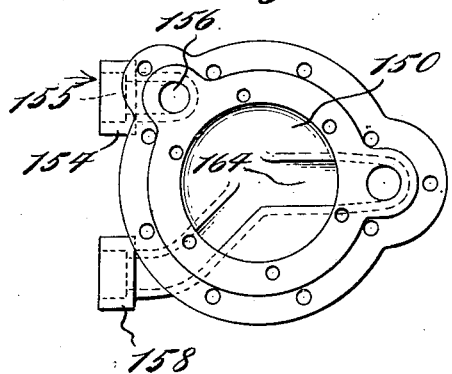
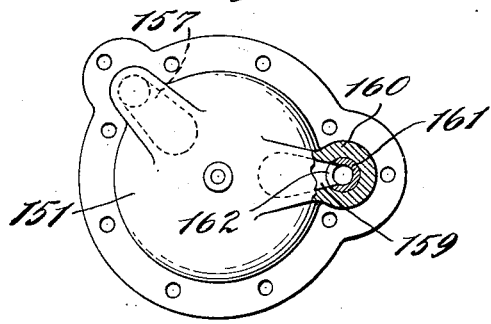
INVENTOR.
Embury McLean
BY Gifford Bull
his ATTORNEYS Patented Dec. 20, 1927.

1,653,438

UNITED STATES PATENT OFFICE.

EMBURY McLEAN, OF BROOKLYN, NEW YORK, ASSIGNOR TO THE ENGINEER COMPANY, OF NEW YORK, N. Y., A CORPORATION OF NEW YORK.

REGULATOR OR CONTROLLER.

Original application filed June 25, 1920, Serial No. 391,779. Divided and this application filed September 20, 1921. Serial No. 502,039.

My invention relates to new and useful improvements in regulators or controllers, and especially contemplates a regulator which will be operative as a motor or regulator to actuate or regulate any desired apparatus or element in accordance with variations of the volume or amount of a fluid flowing through the regulator or controller.

The invention consists in the novel construction to be more fully described hereinafter, and the novelty of which will be particularly pointed out and distinctly claimed.

I have fully and clearly illustrated a preferred embodiment of my invention in the accompanying drawings to be taken as a part of this specification, and wherein—

Figure 1 is a transverse section through one form of the invention;

Fig. 2 is a plan view of the lower portion or half of the casing of the device shown in Fig. 1, and Fig. 3 is a top plan view, partly in section, of the upper portion or half of the casing of the device shown in Fig. 1, certain parts being omitted for the sake of clearness.

This application is a division of my prior application for Letters Patent, filed June 25, 1920, and bearing Serial Number 391,779.

Referring to the drawings by characters of reference—150 designates a lower half or member of a diaphragm chamber, the upper half of which is shown at 151, said members being connected by headed bolts 152 and nuts thereon, said members clamping between them a flexible diaphragm 153 shutting off communication between said members, except as hereinafter described. Integral with the member 150 is an inlet connection 154 having a port 155 leading to an opening 156 through the flange of the member 150 leading into a passage 157 in the wall of the member 151, said passage 157 communicating with the space in said member 151 above the diaphragm 153. The connection 154 is connected to any suitable source of fluid, preferably under pressure, for example, oil under pressure from a pump (not shown). Connected to the lower member 150 is an outlet connection 158 (Fig. 2) opening into the lower chamber of the device below the diaphragm 153, said connection 158 being connected to a pipe (not shown) leading from said regulator to any suitable point, for example, an oil burner (not shown). The chamber in the upper member 151 above the diaphragm 153 opens through a port 159 into a valve casing 160, preferably formed integral with the member 151, and containing a tapered turn-plug valve 161, the latter having a port 162 adapted to communicate with the said port 159, and leading to the internal bore 163 of the valve, which, in turn, communicates with a passage 164 leading into the member 150 beneath the diaphragm 153. In order to provide for a tight fit, the valve 161 is preferably tapered and fitted to a correspondingly tapered bore in the casing 160 and is urged to its seat by a spring 165 surrounding a stem 166 on said valve, and at one end abutting a packing gland 167 threaded into the casing 160, and at its other end abutting the upper end of the said valve 161. The valve is provided with a head 168 adapted to be engaged by a wrench or other suitable means by which it may be rotated. Connected to the diaphragm 153, in any suitable manner, as at 169, is one end 170 of a rod 171 extending upward through a stuffing-box 172 in the upper wall of the member 151, the upper end of said rod 171 being pivotally connected, as at 173, to a lever 174, one end of which is pivoted, as at 175, to the member 151, and the other end of which is adapted to be connected by a flexible connection 176 to any device which is adapted to be operated, regulated or controlled by the regulator. The means for connecting the rod 171 to the diaphragm, consists of dished plate 170$^a$ having a flange 170$^b$ secured by a fluid-tight joint to the lower face of the diaphragm by means of screws 170$^c$ extending through said flange, packing washers 170$^d$ between the flange and the diaphragm, and threaded into a washer or ring on the upper side of the diaphragm. The dished portion of the plate 170$^a$ extends upward through a central opening in the diaphragm and has a central opening 170$^f$ through which the rod 171 extends, the rod having beneath said plate an enlargement or head 170 of greater diameter than the opening in said plate so that the rod and plate are connected. The under side of the plate is closed against leakage by a plate 171$^g$ held in place by the screws 170$^c$. On the casing of the regulator is a bracket 178 between which and the lever 174 is suitably supported and held a compression spring 179 tending to move the lever 174 upward. One end of the spring 179 is seated in a spring seat 180 supported on one end of an adjusting screw 181 threaded through the bracket 178, and by means of which the resistance of the spring 179 to downward movement of the lever 174 may be adjusted. The screw 181 may be locked in adjusted position by a jam nut 182 threaded thereon. Supported by the bracket 178 is a scale member 183 having a scale 184 calibrated to indicate gallons per minute or other unit of time-rate of flow of fuel to the burner, the upper edge of said lever 174 cooperating as a pointer with said scale. It will be understood that said scale may be calibrated to indicate any useful information measurable by position or movement of the diaphragm 153. The operation of this device is as follows:—

The fluid enters the connection 154 and flows through port 155 and the opening 157 into the space above the diaphragm 153, thence through the port 159 and valve ports 162, 163 and port 164 into the space beneath the diaphragm 153, from which space it flows outward through outlet 158. The valve 161 is operable to cause a restriction to the flow between the upper and lower chambers of the regulator having the diaphragm between them, so as to create a reduction in pressure in the chamber beneath the diaphragm, this reduction in pressure being employed to cause movement of the diaphragm to operate the lever 174 to control the dampers. It will be understood that the valve 161 is set so as to result in a restriction giving the desired difference in pressure between the fluid in the two chambers, and that any variations of this difference of pressure, due to fluctuations in the volume of flow, will operate the diaphragm to correspondingly regulate or operate the element or mechanism to which it is connected. The chambers on opposite sides of the diaphragm 153 are preferably designed so as to be of equal volume and substantially symmetrical in shape so that the effect of the velocity head of the fluid flowing through them will not tend to move the diaphragm, any action of the velocity head on one side of the diaphragm being counterbalanced by a similar action on the other side. The result of the neutralizing or counterbalancing of the velocity head in the two chambers, is that the diaphragm is actuated by the difference in static pressure due to the restriction in the passage between the two chambers. It will thus be seen that the greater the amount of oil flowing through the regulator, the greater will be difference in pressure between the fluid above the diaphragm 153 and that below said diaphragm, resulting in the excess pressure above the diaphragm moving the rod 171 to swing the lever 174. If the amount of fluid flowing through the regulator is reduced, it results in a reduction of the difference in pressure between the oil above the diaphragm 153 and below said diaphragm, permitting the diaphragm to move upward, whereupon the spring 179, acting against the difference of pressure in the regulator moves the lever 174 upward to control the desired element.

The valve 161 can be so adjusted that the variations in difference of pressure, due to variations of volume of flow which cause the travel of the rod 171, can be made to give the desired operation of the part to which said rod is connected to be operated thereby.

What I claim and desire to secure by Letters Patent of the United States is:—

1. A regulator comprising two chambers separated by a flexible diaphragm, a restricted passage connecting said chambers, an inlet for the fluid connected to one of said chambers, an outlet connected to the other of said chambers, said inlet and outlet being connected to their respective chambers at opposite sides thereof from said restricted passage, the parts being constructed and arranged to cause the fluid to flow from the inlet through one chamber substantially parallel to said diaphragm, through said restricted passage and then through the other chamber substantially parallel to said diaphragm to the outlet whereby the forces exerted on opposite sides of said diaphragm due to the flow of fluid are substantially equal, whereby the diaphragm is operated by the difference in static pressure in said chambers, and operating means actuated by the movement of said diaphragm.

2. A regulator comprising two chambers separated by a flexible diaphragm, a restricted passage connecting said chambers at one side thereof, an inlet for the fluid connected to one of said chambers and an outlet connected to the other of said chambers at substantially the opposite sides from said restricted opening, the chambers on opposite sides of the diaphragm being formed so as to be of substantially equal volume and symmetrical in shape, whereby the force exerted by the fluid flowing through said chambers due to the velocity thereof is substantially equal on opposite sides of the diaphragm, the parts being constructed and arranged to cause the diaphragm to be affected by the pressure due to the velocity flow of the fluid on one side to the same extent and in opposite direction to that due to the velocity flow on its opposite side.

3. A regulator comprising two chambers separated by a flexible diaphragm, a restricted passage connecting said chambers, an inlet for the fluid connected to one of said chambers, an outlet connected to the other of said chambers, said inlet and outlet being connected to their respective chambers at points remote from said passage whereby the fluid flows through both of said chambers, the said inlet and outlet being so connected to their respective chambers, and the chambers being so formed that the forces exerted on opposite sides of said diaphragm due to the flow of fluid are substantially equal, whereby the diaphragm is operated by the difference in static pressure in said chambers, an indicator, and means actuated by the diaphragm cooperating with said indicator to show the quantity of fluid flowing through the regulator.

In testimony whereof I have hereunto signed my name.

EMBURY McLEAN.